July 30, 1929.  G. G. ROBERTS  1,722,445

SHEET GLASS DRAWING APPARATUS

Filed Jan. 27, 1927

Inventor
G. G. ROBERTS
By Davis & Davis
Attorney

Patented July 30, 1929.

1,722,445

UNITED STATES PATENT OFFICE.

GEORGE G. ROBERTS, OF ARLINGTON COUNTY, VIRGINIA, ASSIGNOR TO VIRGINIA PLATE GLASS CORPORATION, OF WASHINGTON, DISTRICT OF COLUMBIA, A CORPORATION OF VIRGINIA.

SHEET-GLASS-DRAWING APPARATUS.

Application filed January 27, 1927. Serial No. 164,035.

This invention relates to that type of sheet-glass-making methods and apparatus in which the sheet of glass is drawn in the flat from a molten mass of glass by means of a bait-bar which is dipped into the molten glass and slowly drawn upwardly therefrom, and the main object of the present invention is to eliminate the tendency of the sheet to narrow as it ascends from the bath, as more fully hereinafter set forth.

In the drawing—

Figure 1:
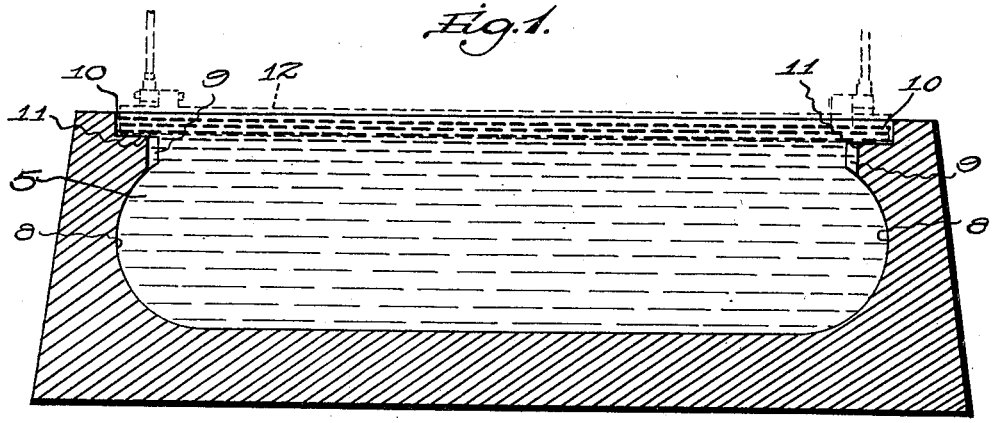
Fig. 1 is a vertical sectional view of a crucible embodying my invention.
Figure 2:
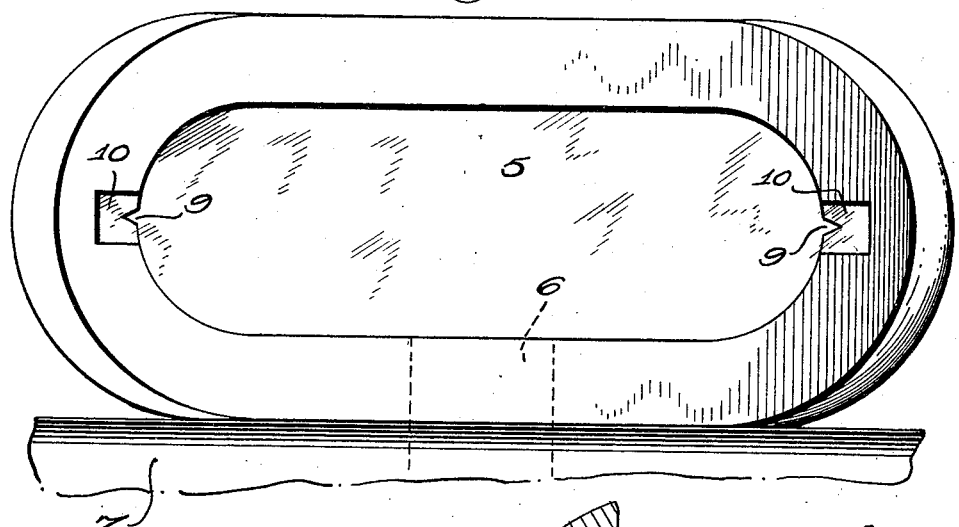
Fig. 2 is a plan view thereof.
Figure 3:
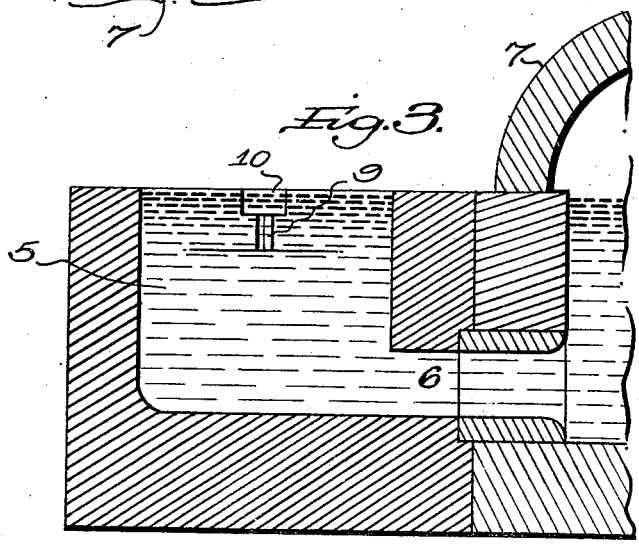
Fig. 3 is a vertical transverse section thereof.
Figure 4:
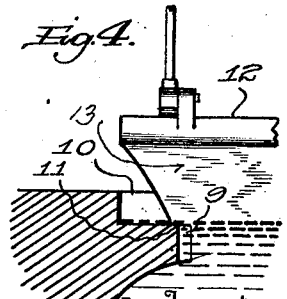
Fig. 4 is a detail view showing the parts in the act of drawing a sheet.

Referring to the drawing annexed by reference-characters, 5 designates a crucible constructed substantially in accordance with my former Patent No. 1,597,543, August 24, 1926, in that it is generally oval in horizontal section. This crucible may be a single receptacle, as illustrated in my aforesaid patent, or it may, as in the present instance, be connected by a passageway 6 to a melting-furnace 7 of large capacity so as to continuously supply the crucible with molten glass, to thereby permit continuous or many-times-repeated drawing operations to be performed. The crucible is so positioned with reference to the melting-furnace that the level of the glass in the crucible will be approximately even with the top edge of the crucible, so that during the drawing operations the level of the glass in the crucible will be maintained practically at the upper edge of the crucible. This level will be approximately maintained by feeding glass-making materials into the far end of the melting-furnace.

The end walls of the crucible are desirably elongated at 8, and also provided with vertical grooves 9 as disclosed in my aforesaid former patent. My present crucible differs from the one illustrated in my patent in that it is provided with molten-glass-receiving pockets 10 at the ends of the crucible, these pockets being formed in the top face of the crucible, in communication with the guide-grooves 9. These pockets are adapted to receive the ends of the bait 12, the bait-bar being lengthened sufficiently to insure its ends, when the bait-bar is lowered, entering the respective pockets. These pockets are, as will be observed, positioned with respect to the level of the glass so that the glass will flow into them, thereby submerging the guide-grooves 9.

I preferably use the hollow bait illustrated in my former Patent No. 1,567,300, December 29, 1925, which is constructed with a slot in its under side running the full length of the bait, means being provided whereby the interior of the bait is exhausted of air to thereby cause a sufficient suction action on the glass to draw it into the bait when the lower edge of the bait is dipped into the molten glass. Any other form of bait-bar may be employed which will insure the glass adhering to the bait along those portions of the bait which extend into the pockets 10. With the glass 13 adhering to the bait throughout its length, the edges of the sheet will, as formerly, be formed in the grooves 9 and the sheet will draw off the upper corners 11. By reason of the fact, however, that the line of attachment of the plate to the bait is longer than the distance between these two drawing corners 11, the tendency is to pull the edges of the sheet outwardly, i. e., away from the vertical center of the sheet. As this tendency will be maintained throughout the drawing operation, the natural tendency of the sheet to narrow at its lower end as the sheet lengthens will be counteracted and thus insure a sheet of uniform width, irrespective of length.

Heretofore, the bait has been made slightly shorter than the distance between the drawing edges or corners of the crucible or nozzle, as it was essential that the bait should pass down between such edges or corners in order to make contact with the molten glass. This naturally brought about a slight tendency of the edges of the sheet to pull inwardly, with the result that, as the sheet lengthened, this pull became so great as to finally pull the edges of the sheet away from the drawing corners or edges. I avoid this pulling-in tendency entirely by so relatively constructing the bait and the crucible that there will always be more or less of a tendency to pull outwardly on the edges of the sheet. As stated, the pockets 10 will be so positioned with respect to the normal level of the glass that the glass will have a tendency to continuously flow into these pockets, so that after each drawing operation—that is, after a drawn sheet is cut off and taken away—the molten glass will flow into and refill these pockets 10. During a drawing operation, owing to the lowered viscosity of the glass in the vicinity of the drawing points 11 of the crucible, the pockets will not completely refill, so that these pockets will not interfere with the proper formation of the edges of the sheet in the grooves 9, but will assist in forming and maintaining such edges.

It will be observed that the pockets 10 are wider than the sheet that is to be drawn, so that there is room at each side of the sheet for glass to flow from the crucible into the pockets to thus maintain an ample supply of cooling glass to insure adhesion of the sheet to the drawing-corner groove 9.

What I claim as new is:

1. A crucible for drawing plate glass having an elongated opening with drawing-corners at each end, determining the width of the sheet, and pockets formed in the upper surface of the crucible in position to receive molten glass as well as the ends of the bait.

2. In a glass-drawing apparatus, a bait, a crucible having a drawing-opening of less length than the bait and provided with end-pockets adapted to receive molten glass and the ends of said lengthened bait, for the purpose set forth.

3. A crucible for drawing plate-glass having a drawing-opening which is substantially oval in horizontal section, the end walls being centrally provided each with a vertical guide-groove for the edge of the sheet, each groove leading to a drawing-corner or edge, said crucible being provided at each end with a depression or pocket communicating with said groove and extending toward the adjacent end of the crucible, these pockets or depressions being positioned to receive molten glass from the crucible and also receive the ends of the bait.

4. A crucible for drawing plate-glass having an elongated opening with a drawing-corner at each end, determining the width of the sheet, and pockets formed in the upper surface of the crucible in position to receive molten glass therefrom, one pocket being located adjacent each of said drawing-corners and each pocket being open to the crucible at its inner end and closed at its outer end and also closed at its sides so that glass can flow into the pocket only from the crucible.

5. A crucible for drawing plate-glass having an elongated opening with a drawing-corner at each end, determining the width of the sheet, each of these drawing-corners being vertically grooved, a pocket being formed in the top side of the crucible around each drawing-corner and groove, the inner end of said pocket opening into the crucible and its sides and outer end being closed, each pocket being wider than the sheet to be drawn, so that molten glass may flow into the pockets on both sides of the sheet as the sheet is drawn.

6. A crucible for drawing plate-glass having an elongated opening with a drawing-corner at each end, determining the width of the sheet, pockets being formed in the upper surface of the crucible at each of said drawing-corners, said pockets extending outwardly away from said corners and being wider than the sheet to be drawn, so that molten glass may flow into the pockets during the drawing of the sheet, and a glass-melting furnace connected by a passageway with said crucible to deliver glass thereinto, said pockets being so positioned with reference to the level of glass in the furnace that glass will flow into the pockets by gravity while the sheet is being drawn.

In testimony whereof I hereunto affix my signature.

GEO. G. ROBERTS.